United States Patent [19]

Parsons

[11] Patent Number: 5,638,930
[45] Date of Patent: Jun. 17, 1997

[54] STRUT-TYPE SYNCHRONIZER

[75] Inventor: George A. Parsons, Grosse Pointe, Mich.

[73] Assignee: New Venture Gear, Inc., Troy, Mich.

[21] Appl. No.: 574,265

[22] Filed: Dec. 18, 1995

[51] Int. Cl.⁶ .................................................. F16D 23/06
[52] U.S. Cl. .................. 192/53.32; 192/53.342; 74/339
[58] Field of Search .................. 192/53.342, 53.3, 192/53.32, 53.34, 53.341; 74/339

[56] References Cited

U.S. PATENT DOCUMENTS

| | | | |
|---|---|---|---|
| 2,221,893 | 11/1940 | White | 192/53.342 |
| 3,631,952 | 1/1972 | Sugimoto et al. | 192/53.342 |
| 4,132,298 | 1/1979 | F'Geppert | 192/53.342 |
| 4,584,892 | 4/1986 | Hiraiwa et al. | 192/53.342 X |
| 5,085,303 | 2/1992 | Frost . | |
| 5,113,985 | 5/1992 | Frost . | |
| 5,113,986 | 5/1992 | Frost . | |
| 5,135,087 | 8/1992 | Frost . | |

FOREIGN PATENT DOCUMENTS

| | | | |
|---|---|---|---|
| 1181512 | 6/1959 | France | 192/53 F |
| 1555158 | 1/1971 | Germany | 192/53 F |

Primary Examiner—Richard M. Lorence
Attorney, Agent, or Firm—Harness, Dickey & Pierce, P.L.C.

[57] ABSTRACT

The present invention relates to a strut-type synchronizer. The conventional multi-component strut assembly is replaced with a one-piece strut component having a base segment and a key segment interconnected by a cantilevered biasing segment. The base segment is adapted to be mounted for sliding movement in a guide slot formed in the clutch hub while the key segment is adapted to engage the internal splines of the axially movable clutch sleeve. The biasing segment is adapted to resiliently bias the key segment into engagement with internal splines of clutch sleeve. The one-piece strut component reduces the number of parts associated with the strut-type synchronizer and results in simple and more cost effectively assembling operations.

12 Claims, 5 Drawing Sheets

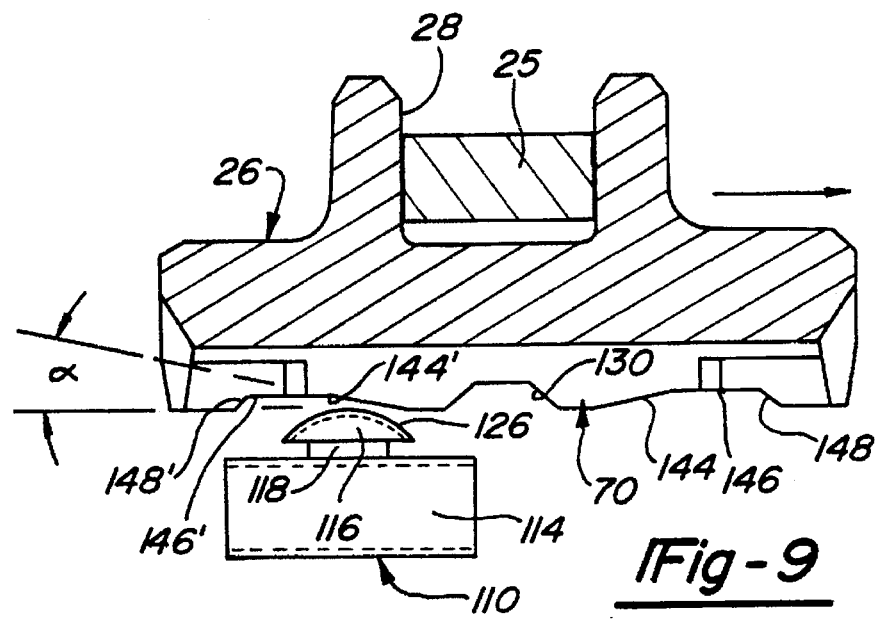
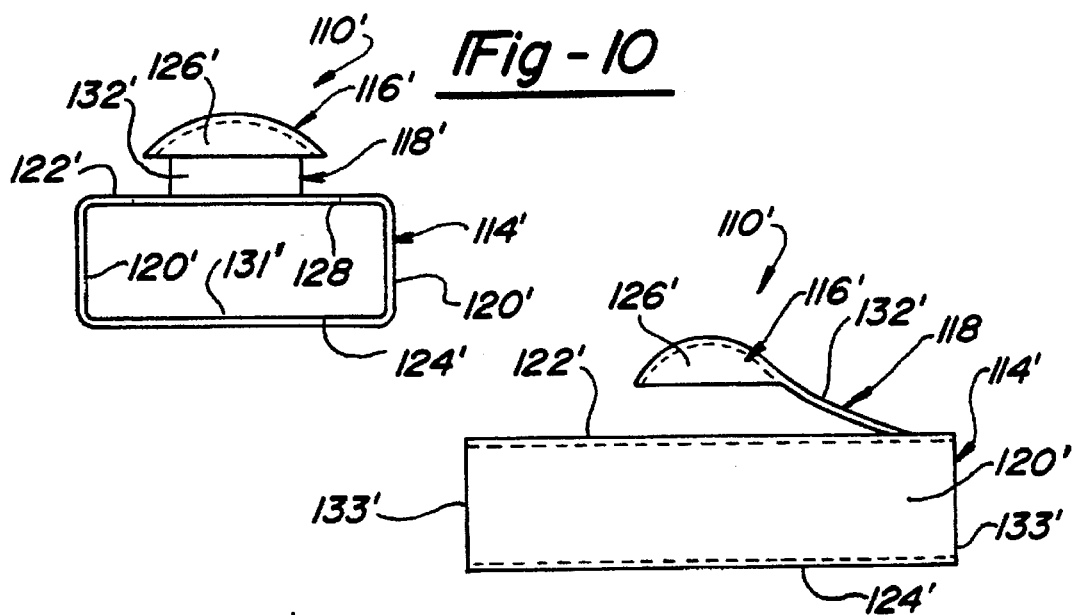
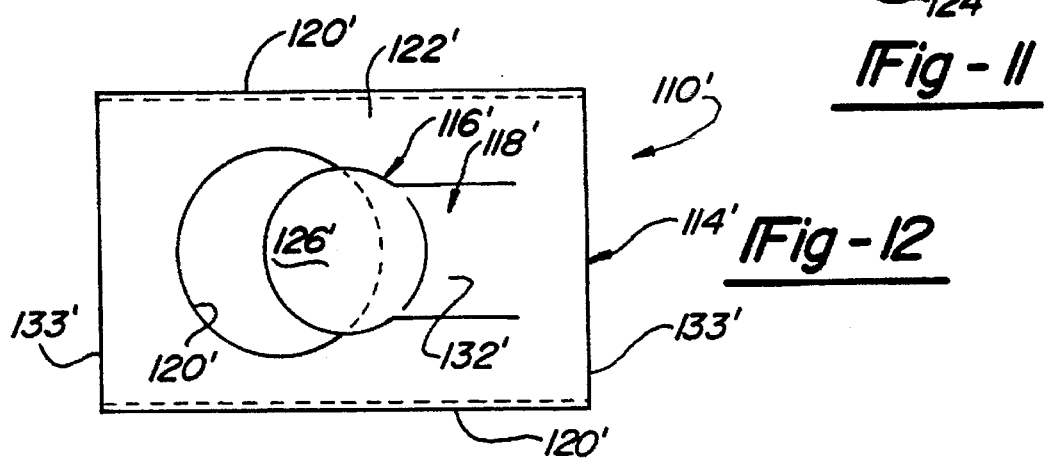

STRUT-TYPE SYNCHRONIZER

BACKGROUND OF THE INVENTION

The present invention relates generally to synchronizers for manually-shifted power transfer devices and, more particularly, to an improved strut-type synchronizer.

Strut-type synchronizers, as used in manually-operated transmissions and four-wheel drive transfer cases, generally include a plurality of spring-biased struts that are radially interposed between a clutch hub fixed for driven rotation with a mainshaft and a sliding clutch sleeve. A spring member is typically installed between the clutch hub and the strut for radially biasing the strut into a central detent groove formed in the clutch sleeve. As is known, the clutch sleeve is splined to the clutch hub for common rotation therewith. Moreover, axial displacement of the clutch sleeve causes the struts to initially move with the clutch sleeve until the struts engage a blocker ring that is also coupled for driven rotation with the clutch hub and which blocks further axial displacement of the clutch sleeve until speed synchronization is complete. Specifically, such axial movement of the struts causes energization of the synchronizer which, in turn, causes frictional engagement between facing surfaces on the blocker ring and a non-driven speed or ratio gear for generating sufficient torque therebetween to "clock" the blocker ring to an indexed position and rotatably drive the ratio gear. Synchronization is achieved when the relative speed between the blocker ring and ratio gear approaches zero. Thereafter, continued axial movement of the clutch sleeve is permitted and the spring members are radially compressed for allowing the clutch sleeve to pass over the struts. In this manner, internal clutch teeth formed on the clutch sleeve are permitted to pass into meshed engagement with external clutch teeth formed on the ratio gear for transmitting power (i.e., drive torque) from the mainshaft to the ratio gear.

Strut-type synchronizers, such as the type disclosed in commonly-owned U.S. Pat. No. 5,113,986 to Frost, additionally have the ability to completely "de-energize" upon disengagement of the clutch sleeve from the ratio gear when the synchronizer is returned to a "neutral" position. In particular, as the synchronizer is selectively de-energized, the spring member imparts an axially directed force on the blocker ring for urging the blocker ring to retract toward a "non-energized" position. Even when the blocker ring is in the non-energized position, the spring member continues to apply an axial biasing force thereon for inhibiting self-energization due to residual viscous effects acting on the synchronizer. In addition, commonly-owned U.S. Pat. No. 5,085,303 to Frost discloses a strut-type synchronizer including a clutch shift sleeve having a profiled internally splined surface that is adapted to coact with the struts for counteracting normal drag forces produced due to axial movement of the clutch sleeve. The spline tooth "profile" was developed to minimize frictional resistance to axial movement of the clutch sleeve, thereby promoting improved "shift feel".

While strut-type synchronizers function satisfactorily for their intended purpose, a problem associated with many strut-type synchronizer is the difficulty associated with assembling the plurality of components into the synchronizer assembly. Additionally, once the spring and strut have been installed between the clutch hub and sliding clutch sleeve, the spring has the tendency to twist and/or become dislodged.

SUMMARY OF THE INVENTION

It is therefore an object of the present invention to provide an improved strut-type synchronizer mechanism utilizing a one-piece strut component having a base segment, a biasing segment, and key segment. The base segment is seated within a open-ended groove formed in the outer periphery of the clutch hub that is fixed for rotation with the mainshaft. The biasing segment interconnects the key segment to the base segment and functions to resiliently bias the key segment into engagement with a detent groove formed in the sliding clutch sleeve. Accordingly, the one-piece strut of the present invention is designed to simplify assembly of the synchronizer mechanism, reduce associated costs and eliminate the alignment and retention problems associated with conventional strut-type synchronizers.

Additional objects, features, and advantages of the present invention will become apparent from a reading of the following detailed description and appended claims, taken in conjunction with the accompanying drawings.

BRIEF DESCRIPTION OF THE DRAWINGS

FIG. 9 illustrates the continued axial movement of the clutch sleeve relative to the one-piece strut following synchronization;

FIG. 10 is an end view of an alternative construction for the one-piece strut;

FIG. 11 is a side view of the one-piece strut shown in FIG. 10; and

FIG. 12 is a top view of the one-piece strut shown in FIGS. 10 and 11.

DETAILED DESCRIPTION OF THE INVENTION

Figure 1:
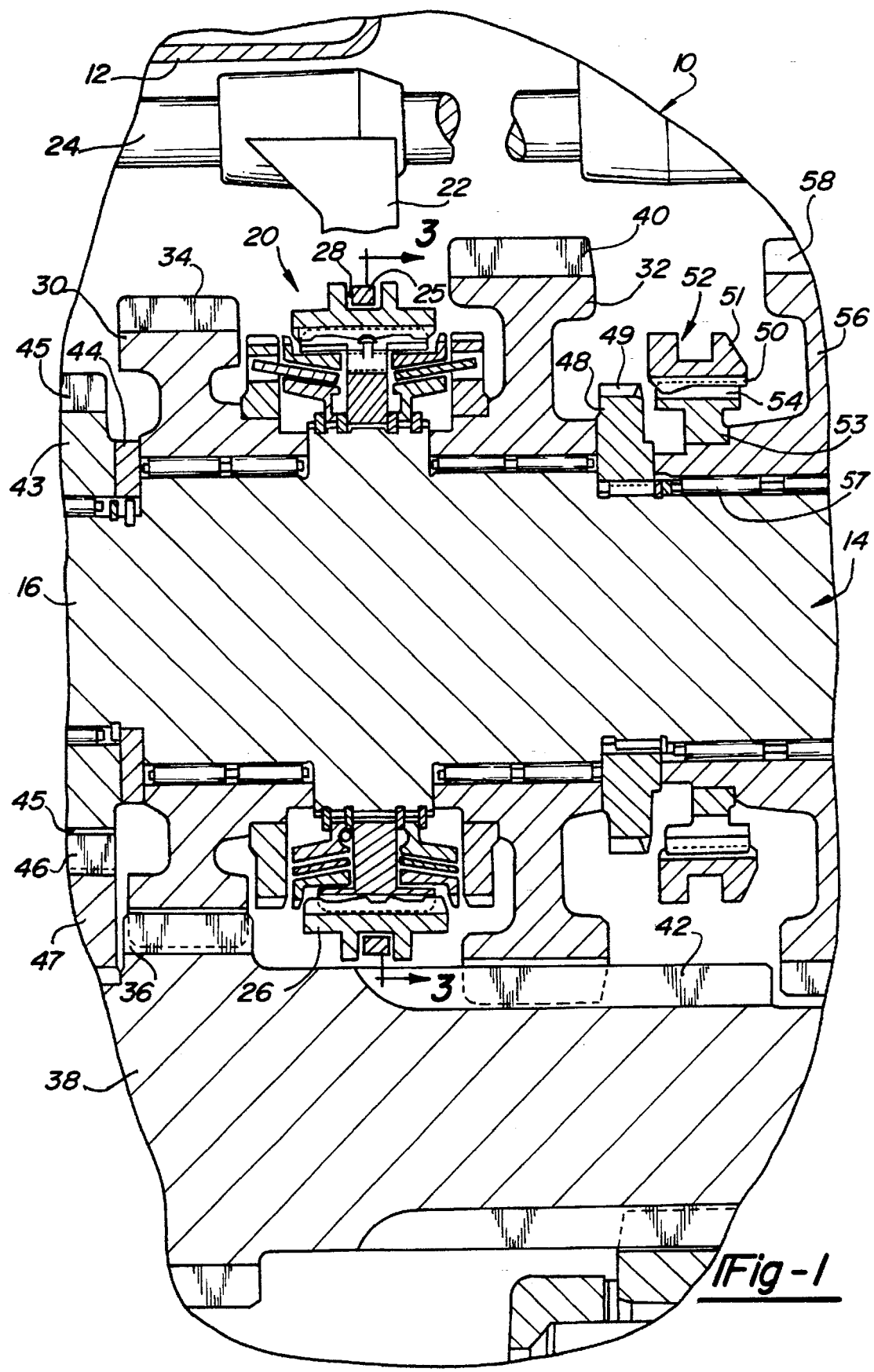
FIG. 1 is a fragmentary cross-sectional view of a portion of an exemplary manual transmission equipped with the improved strut-type synchronizer mechanism of the present invention.

In general, the present invention is directed to a synchronizer mechanism of the type commonly referred to as a "strut-type" synchronizer. As is conventional, the strut-type synchronizer mechanism of the present invention functions to permit a rotatably driven member to be coupled to a non-driven member once speed synchronization therebetween has been accomplished. As will be described hereinafter in greater detail, the strut-type synchronizer mechanism of the present invention is an improvement over conventional strut-type synchronizers and results in simplified assembly into any suitable power transfer device and reduced assembly-related costs. However, it will be appreciated that while the drawings specifically illustrate the strut-type synchronizer mechanism as a dual-cone synchronizer, the one-piece strut feature of the present invention is readily adaptable for use with virtually any suitable, single or multiple cone, strut-type synchronizer mechanism. Likewise, it is to be understood that while the synchronizer mechanism of the present invention is shown in a bi-directional application (i.e., such as in a manual transmission) it can also be used in unidirectional application (i.e., such as in a transfer case) without departing from the fair scope of the present invention.

With particular reference to the drawings, a portion of a multi-speed manual transmission 10 for use in a motor vehicle is shown. For a more detailed description of an exemplary manual transmission suitable for use with the present invention, reference may be had to commonly-owned U.S. Pat. No. 4,677,868 to Filkins. Transmission 10 includes a gear box housing, partially shown at 12, journally supporting an input shaft (not shown). The input shaft is connected by suitable clutch means to a motor vehicle engine crankshaft (not shown) journally supported in a circular housing opening as described in the above-mentioned Filkins patent.

A driven member, shown as a transmission mainshaft 14, has a forward pilot end 16 of a reduced diameter which is coaxially journaled within an axial bore formed in the input shaft while a forward bearing assembly (not shown) supports the forward end of mainshaft 14 in housing 12. Again such conventional structure is shown and thoroughly described in the above-mentioned Filkins patent. One or more double-acting, double-sided or bi-directional synchronizer mechanisms 20 is mounted on mainshaft 14. Synchronizer mechanism 20 is actuated (i.e., energized) by a vehicle operator selectively shifting a conventional gearshift lever (not shown) which is interconnected to a mechanical shift fork mechanism, partially indicated by reference numeral 22, that is supported on a gear box shift selector rail 24. Thus, shift fork 22 is longitudinally slidable with its selector rail 24 in response to the vehicle operator shifting the gearshift lever. Shift fork 22 is connected by a yoke portion, partially shown by reference numeral 25, to a clutch sleeve 26 associated with synchronizer mechanism 20 by means of a circumferential external groove 28 formed in clutch sleeve 26.

Synchronizer mechanism 20 is shown to be located between a pair of non-driven members, namely a second speed gear 30 and a first speed gear 32, both of which are journally supported on mainshaft 14. Second speed gear 30 has its gear teeth 34 in constant meshing engagement with gear teeth 36 formed on a transmission countershaft 38. Countershaft 38 is disposed parallel to mainshaft 14 and is suitably rotatably supported in housing 12. In a like manner, first speed gear 32 has its teeth 40 in constant meshing engagement with gear teeth 42 formed on countershaft 38. It will be noted that a portion of a third speed gear 43 is separated from second speed gear 30 by thrust washer 44 and that its gear teeth 45 are in constant mesh with gear teeth 46 of a drive gear 47 fixed (i.e., splined) to countershaft 38. Further, a reverse clutch ring 48 is fixed (i.e., splined) on mainshaft 14 and has its external clutch teeth 49 adapted to engage internal splines 50 formed on a shift sleeve 51 associated with a reverse clutch mechanism, indicated generally at 52. Reverse clutch mechanism 52 has its hub 53 formed with an externally-splined tooth surface 54 which is in constant mesh with internal splines 50 on reverse shift sleeve 51. Hub 53 is fixed on a reverse gear 56 which is shown journally supported on mainshaft 14 by needle bearings 57. Reverse gear 56 has its gear teeth 58 spaced from countershaft 38 and in constant mesh with a conventional reverse idler gear (not shown).

Figure 2:
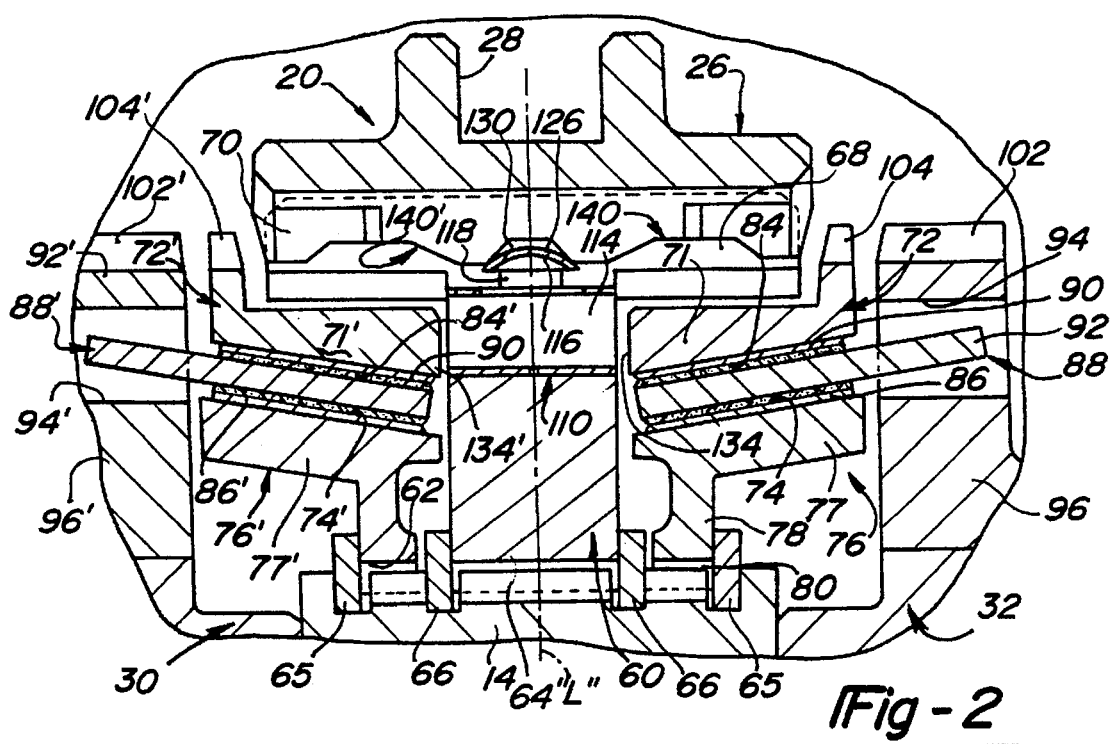
FIG. 2 is an enlarged fragmentary cross-sectional view of a portion of the strut-type synchronizer mechanism shown in FIG. 1.
Figure 3:
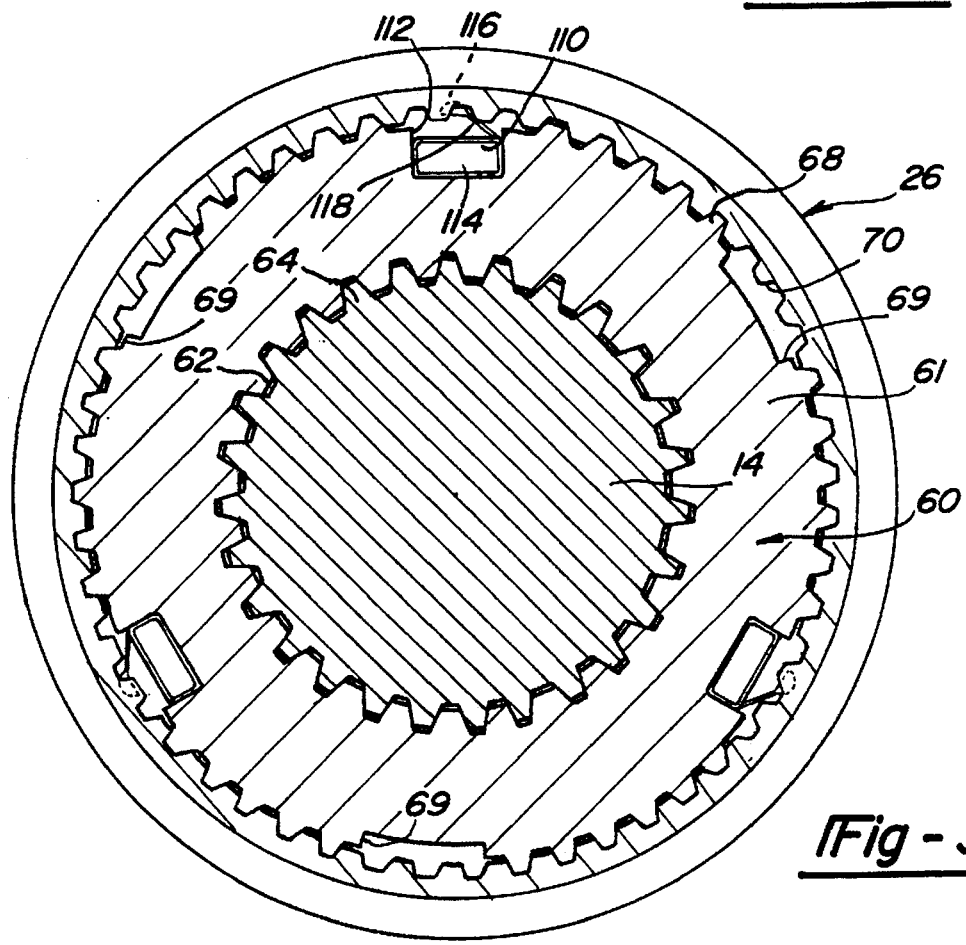
FIG. 3 is a cross-sectional view taken along line 3—3 of FIG. 1.
Figure 4:
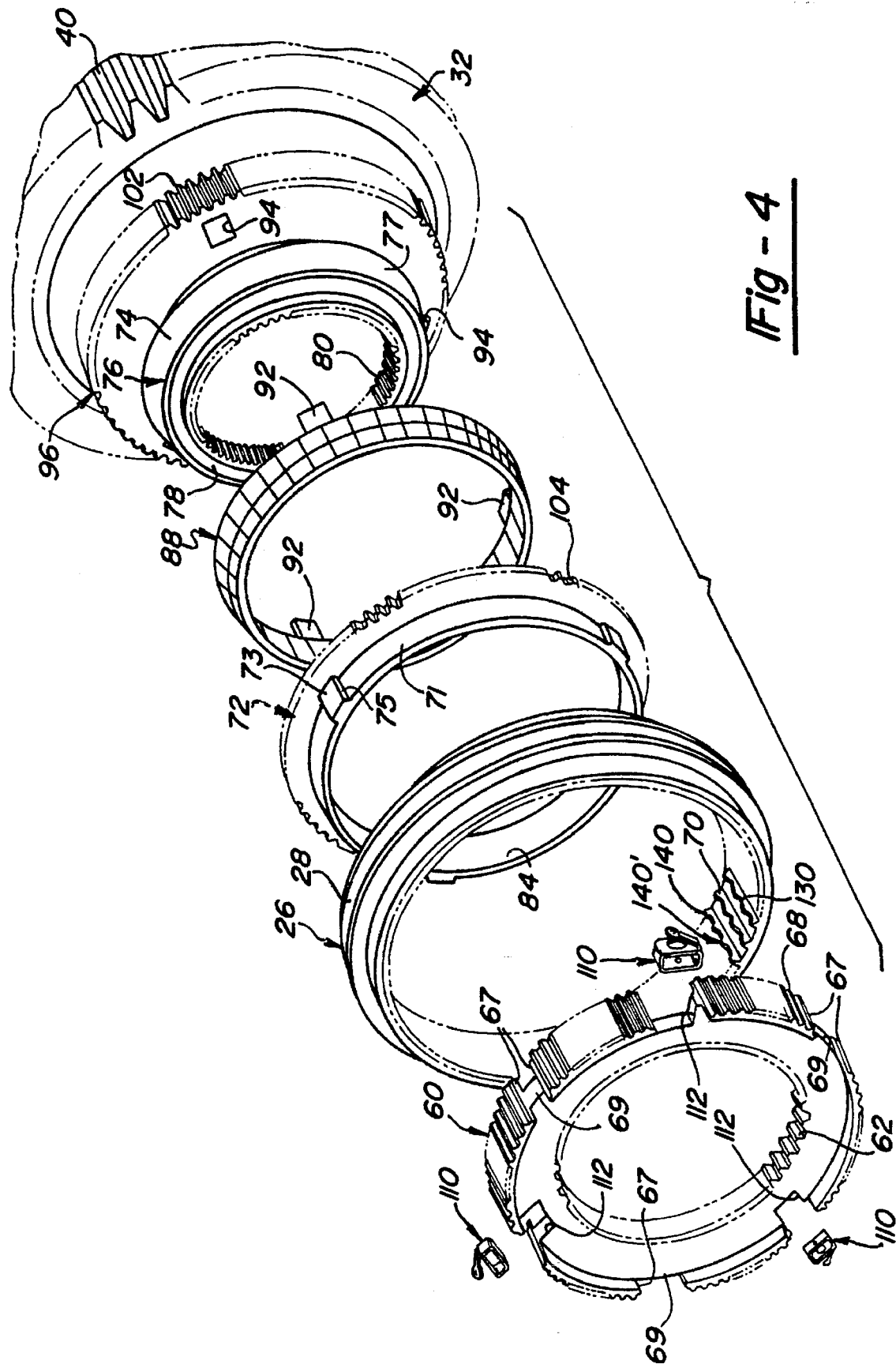
FIG. 4 is an exploded perspective view of the components associated with the synchronizer mechanism shown in FIG. 1.

As best seen from FIG. 2 through 4, strut-type synchronizer mechanism 20 includes a clutch hub 60 that is fixed to mainshaft 14 through internal splines 62 engaging mainshaft external splines 64. A first pair of snap rings 65 are provided to retain inner cone rings 76 and 76' associated with synchronizer mechanism 20, while a pair of second snap rings 66 are provided to axially position and maintain clutch hub 60 on mainshaft 14. Clutch sleeve 26 is mounted for rotation with clutch hub 60 by means of clutch sleeve internal splines 70 engaging clutch hub external splines 68. Thus, clutch sleeve 26 is axially movable in fore and aft directions on clutch hub 60 in response to movement of shift fork 22. Furthermore, external splines 68 on clutch hub 60 are formed with three equally spaced notches 69 for reasons to be explained below.

Accordingly to the particular embodiment shown, synchronizer mechanism 20 is a dual-cone strut-type synchronizer unit having two cone surfaces and two mating friction blocking surfaces for each of its associated first and second speed gears 32 and 30, respectively. Since bi-directional synchronizer mechanism 20 is symmetrical about a central transverse plane, identified by, construction line "L" in FIG. 2, like numbers will be used to describe right and left-hand mirror image components, with the left-hand components having a primed designation. Thus, the structure and operation of the right-hand first speed clutch components of synchronizer mechanism 20 will only be described in detail. Those skilled in this art will recognize the substantially similar structure and function associated with the left-hand "primed" components.

With particular reference to FIGS. 2 and 4, synchronizer mechanism 20 is shown to include a blocker ring 72 having three equally-spaced lugs 73 formed on an axial segment 71 thereof. Each lug 73 is adapted to nest within one of notches 69 formed in clutch hub 60. Thus, during indexing or "clocking" of blocker ring 72, lugs 73 have one of their side faces 75 in contact with a facing edge surface 67 of notch 69. A first external cone surface 74 is shown formed on a frusto-conical portion 77 of inner cone ring 76. Inner cone ring 76 also has a disc-like portion 78 with internal splines 80 engaged with external splines 64 on mainshaft 14. A first internal cone surface 84 is provided on blocker ring 72. A second internal conical surface 86 is located on the interior of a middle cone ring 88, while a second external conical surface 90 is located on the exterior of middle cone ring 88. In the dual-cone arrangement shown, second internal cone surface 86 is adapted to frictionally contact first external cone surface 74 while second external cone surface 90 is adapted to frictionally contact first internal cone surface 84. It will be noted that in the disclosed embodiment, each of surfaces 86 and 90 are in the form of a friction pad or lining bonded or cemented to its associated metal cone ring surface for providing effective frictional engagement. An example on one type of suitable friction lining that may be used with the present invention is disclosed in U.S. Pat. No. 4,267,912 to Bauer, et al.

With continued reference to FIGS. 2 and 4, middle cone ring 88 is shown to include three axially-extending tangs 92. Drive tangs 92 extend rearwardly and are retained in apertures 94 formed in a clutch ring 96 that is fixedly secured (i.e., splined, welded, etc.) for common rotation with first speed gear 32. For a more detailed description of the function of drive tangs 92, reference may be made to commonly-owned U.S. Pat. No. 4,732,247 to Frost. Clutch ring 96 has clutch teeth 102 which are coaxial and alignable with blocking teeth 104 formed on a raised outer circumferential portion of blocker ring 72. Both clutch teeth 102 and blocking teeth 104 are adapted to be selectively placed in meshed engagement with clutch sleeve internal spline teeth 70 upon clutch sleeve 26 being shifted to the right into its first speed gear mode.

Figure 8:
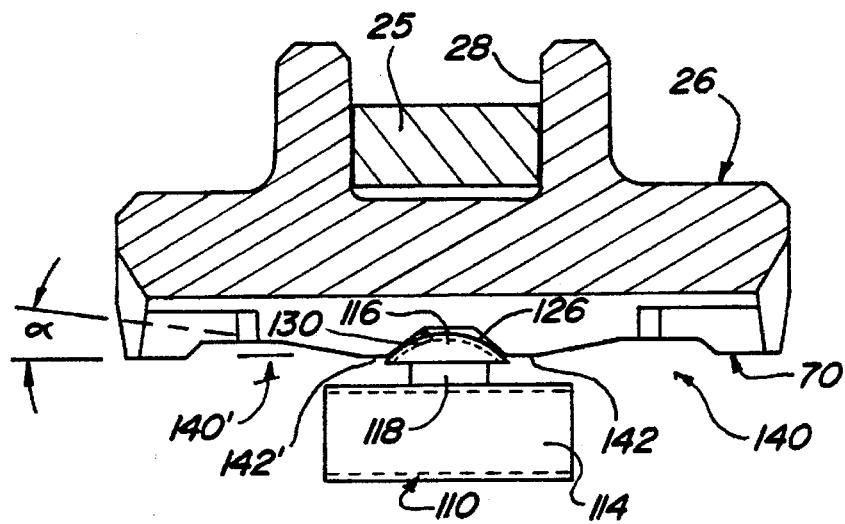
FIG. 8 is an enlarged view illustrating the interaction of the clutch sleeve and the one-piece strut in a "neutral" position.

Clutch sleeve 26 of synchronizer mechanism 20 is shown in FIGS. 1, 2 and 8 in a central disengaged or "neutral" position. Since spline teeth 70 of clutch sleeve 26 are in constant axial sliding engagement with external splined teeth 68 formed on clutch hub 60, clutch sleeve 26 may be shifted to the right or left due to movement of the gearshift lever to complete lock-up of first or second speed gears, respectively, such that internal splines 70 drivingly engages external clutch teeth 102 or 102', respectively.

In strut-type synchronizer mechanism 20, a plurality of struts 110 are equally spaced concentrically about clutch hub 60 and are in disposed non-splined guide slots 112 formed in clutch hub 60. In accordance with the present invention, and as best seen from FIG. 5–7, struts 110 each include a generally rectangularly-shaped base segment 114, a key segment 116, and a biasing segment 118. Base segment 114 of each strut 110 is retained for axial sliding movement within one of guide slots 112. Base segment 114 includes a pair of side walls 120 connecting an upper wall 122 to a lower wall 124. Biasing segment 118 and key segment 116 are formed from an integral cut-out portion of upper wall 122 with key segment 116 forming an arcuate "cup-shape" ball portion 126 from a circular cut-out defined by aperture 128. Functionally, biasing segment 118 is designed to produce an outwardly-directed radial force of sufficient magnitude to seat arcuate ball portion 126 of key segment 116 in a "profiled" detent groove 130 that is circumferentially cut in clutch sleeve internal spline teeth 70 for permitting struts 110 to move axially in concert with clutch sleeve 26 upon actuation of synchronizer mechanism 20. Preferably, biasing segment 118 acts like a cantilevered leaf spring and includes an integral strip 132 connecting key segment 116 to upper wall 122 and/or one of side walls 120 of base segment 114. Integral strip 132 extends outwardly from upper wall 122 and is sized (i.e., width, length, thickness) to generate a desired radial biasing force for maintaining ball portion 126 engaged with profiled detent groove 130. As such, biasing segment 118 is adapted to resiliently deflect in response to movement of profiled detent groove 130 over ball portion 126 upon completion of the speed synchronization process. In the presently preferred form, struts 110 are stamped sheet metal components. After forming, facing lengthwise edges of lower wall portions are welded, as shown by seam 131. As seen from FIG. 6, strip 132 may be partially cut-out from one of side walls 120.

As is known in the synchronizer art, and as best seen in FIG. 2, initial movement of clutch sleeve 26 from its neutral position causes one end surface 133 of base segment 114 to contact an end face 134 of blocker ring 72 for generating initial frictional cone torque loading between blocker ring interior cone surface 84 and outer cone ring exterior blocking surface 90. In response, blocking ring 72 is rotatably "clocked" to an indexed position whereat a side surface 75 of each lug 73 engages an edge surface 67 of each hub notch 69 for preventing continued axial displacement of clutch sleeve 26 until speed synchronization is complete. With blocker ring 72 in its indexed position, clutch sleeve 26 can only move to a chamfer-to-chamfer loading position between the opposed faces of blocking teeth 104 on blocker ring 72 and clutch sleeve interior spline teeth 70. When the speed of first speed gear 32 relative to blocker ring 72 and clutch sleeve 26 approaches zero, the cone torque also falls to zero. Synchronization is now complete and blocker ring 72 is no longer energized. Since the index torque resulting from the chamfer-to-chamfer loading between sleeve internal splines 70 and blocking teeth 104 now exceeds the cone torque, continued axial movement of clutch sleeve 26 causes blocker ring 72 to rotate in an opposite direction out of its "clocked" position. Thereafter, first speed gear 32 rotates to pass sleeve internal spline teeth 70 into engagement with first gear clutch teeth 102. As will be appreciated, similar interaction of the components associated with the left half of synchronizer mechanism 20 occurs during rightward axial movement of clutch sleeve 26 for shifting into engagement with second speed gear 30.

With particular reference now to FIGS. 8 and 9, the spline tooth profile for internal splines 70 of clutch sleeve 26 is shown. Spline teeth 70 are configured to include first and second longitudinally extending ramped grooves 140 and 140', respectively, which are formed on opposite sides of detent groove 130 and separated therefrom by flat surfaces 142 and 142'. Specifically, ramped grooves 140 and 140' are each formed to extend circumferentially and to communicate with detent groove 130. Grooves 140 and 140' are adapted to engage arcuate ball portion 126 of struts 110 upon deflection of biasing segment 118 in response to continued axial displacement of clutch sleeve 26 following ball portion 126 being moved out of detent groove 130 and the neutral position. Ramped grooves 140 and 140' include upwardly and outwardly extending inclined ramp surfaces 144 and 144', respectively adjacent to detent groove 130. At the end of ramp inclined surfaces 144 and 144', axially-extending recessed flat surfaces 146 and 146', respectively, are provided, which terminate in down-turned stop surfaces 148 and 148', respectively. The stop surfaces 148 and 148' are configured to retain ball portion 126 and, in turn, struts 110 within ramped grooves 140 and 140' at the end of maximum axial travel of clutch sleeve 26.

FIGS. 8 and 9 illustrate the interaction of struts 110 and clutch sleeve 26 in the "neutral" position and an exemplary rightwardly disposed axial position of clutch sleeve 26, as it is being moved toward first speed gear 32. FIG. 9 illustrates that upon rightward axial displacement of clutch sleeve 26, key segment 116 of each strut 110 exits detent groove 130 such that arcuate ball portion 126 of each strut 110 slides along flat surfaces 142' and is urged into engagement with ramped groove 140'. Ramp groove 140' is designed to counteract and significantly minimize the frictional drag forces typically encountered when completing a shift following synchronization. More particularly, ramped surface 140' extends at a ramp angle "$\alpha$", relative to a longitudinal axis, which is of sufficient magnitude to produce an axially-directed force from the radially directed biasing of ball portion 126 of struts 110 for urging clutch sleeve 26 in a rightward axial direction. The magnitude of ramp angle "a" is preferably set at least equal to or greater than the friction angle associated with the materials from which struts 110 and sleeve splines 70 are fabricated. As will be appreciated, the interaction of struts 110 and ramp grooves 140 upon leftward axial movement of clutch sleeve 26 toward second speed gear 30 is identical to that described with reference to FIG. 9.

As is clearly seen from FIGS. 2 through 7, struts 110 are installed within synchronizer 20 such that biasing segment 118 is aligned to extend transversely to the direction of sliding movement of clutch sleeve 26. Alternatively, FIGS.

Figure 5:
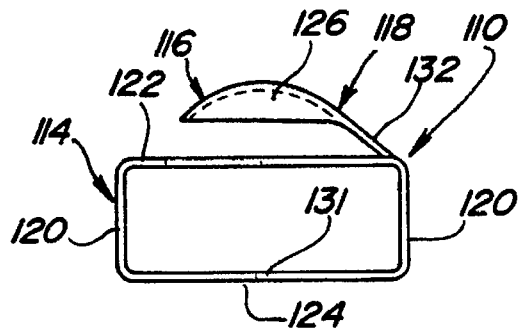
FIG. 5 is an end view of the one-piece strut associated with the strut-type synchronizer mechanism.
Figure 6:
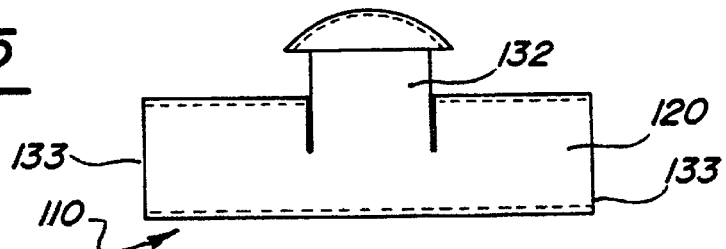
FIG. 6 is a side view of the one-piece strut.
Figure 7:
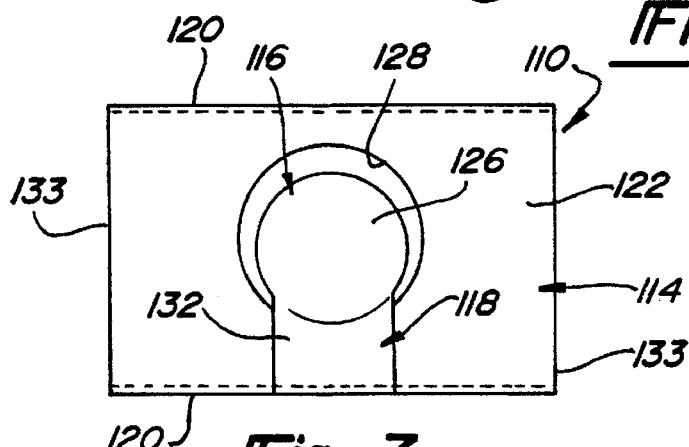
FIG. 7 is a top view of the one-piece strut.

10 through 12 relate generally to FIGS. 5 through 7 with the exception that struts 110' are fabricated such that their biasing segment 118' is commonly aligned with the direction of clutch sleeve 26 movement. As such, integral strip 132' is cut-out of upper wall 122'. Due to the commonality of struts 110' to struts 110, similar structure is identified by a primed reference numeral. In either case, the resulting one-piece strut is a significant improvement over conventional multi-piece assemblies.

While the above detailed description discloses and describes preferred embodiments of the one-piece strut incorporated into a bi-directional strut-type synchronizer mechanism, it is to be understood by one skilled in the art from such discussion, and from the accompanying drawings and claims, that the present invention is susceptible to modification, variation, and alteration without deviating from the spirit, scope and fair meaning of the following claims.

What is claimed is:

1. A synchronizer mechanism for causing speed synchronization between a driven member and a non-driven member, comprising:

a clutch hub fixed for common rotation with the driven member and having a guide slot formed thereon;

a clutch sleeve mounted on said clutch hub for common rotation therewith and axial movement thereon between a first position whereat said clutch sleeve is uncoupled from the non-driven member and a second position whereat said clutch sleeve is coupled to the non-driven member;

a blocker ring coupled for common rotation with said clutch hub and operable to inhibit movement of said clutch sleeve to said second position until speed synchronization is established between the driven member and the non-driven member; and an integral strut component having a base segment retained in said guide slot, a key segment engaging said clutch sleeve, and a biasing segment interconnecting said key segment to said base segment for exerting a radial biasing force on said key segment to maintain engagement thereof with said clutch sleeve during axial movement of said clutch sleeve.

2. The synchronizer mechanism of claim 1 wherein said guide slot extends through a externally-splined surface of said clutch hub, said clutch sleeve includes an internally-splined surface in constant meshed engagement with said externally-splined surface of said clutch hub, and wherein said key segment of said strut component is urged by said biasing segment into engagement with said internally-splined surface of said clutch sleeve such that said strut moves into engagement with said blocker ring in response to movement of said clutch sleeve toward said second position.

3. The synchronizer mechanism of claim 2 further comprising a first frictional surface associated with said blocker ring and a second friction surface associated with the non-driven member, whereby engagement of said strut with said blocker ring causes frictional engagement between said first and second frictional surfaces so as to develop frictional synchronizing torque therebetween, said clutch sleeve internal splines being permitted to pass through blocking teeth on said blocker ring and into meshed engagement with clutch teeth on the non-driven member when the synchronizing torque developed is sufficient to cause speed synchronization between the driven and non-driven members.

4. The synchronizer mechanism of claim 1 wherein said integral strut component is a stamped sheet metal component.

5. The synchronizer mechanism of claim 1 wherein said base segment is generally rectangular in shape and has a pair of side walls interconnecting an upper surface to a lower surface.

6. The synchronizer mechanism of claim 5 wherein said key segment and biasing segment are formed from a cut-out portion of said upper surface of said base segment, said key segment forming a cup-shaped portion and said biasing segment including a leaf spring strip extending outwardly from said base segment upper segment with said cup-shaped portion located at its distal end.

7. The synchronizer mechanism of claim 1 wherein the driven member is a mainshaft in a multi-speed transmission and the non-driven member is a speed gear rotatably supported on said mainshaft.

8. The synchronizer mechanism of claim 1 wherein movement of said clutch sleeve toward said second position operates to energize said synchronizer mechanism, and movement of said clutch sleeve toward said first position operates to de-energize said synchronizer mechanism.

9. A synchronizer mechanism for causing speed synchronization between a driven member and a non-driven member, comprising:

a clutch hub fixed for common rotation with the driven member and having a guide slot formed thereon;

a clutch sleeve mounted on said clutch hub for common rotation therewith and axial movement thereon between a first position whereat said clutch sleeve is uncoupled from the non-driven member and a second position whereat said clutch sleeve is coupled to the non-driven member;

a blocker ting coupled for common rotation with said clutch hub and operable to inhibit movement of said clutch sleeve to said second position until speed synchronization is established between the driven member and the non-driven member; and an integral strut component having a generally rectangular base segment having a pair of side walls interconnecting an upper and a lower surface, said base segment retained in said guide slot, a key segment, and a biasing segment interconnecting said key segment to said base segment, said key segment and said biasing segment being formed from a cut-out portion of said upper surface of said base segment, wherein said key segment engages said clutch sleeve, and said biasing segment exerts a radial biasing force on said key segment to maintain engagement thereof with said clutch sleeve during axial movement of said clutch sleeve.

10. The synchronizer mechanism of claim 9 wherein said key segment being a cup-shaped portion and said biasing segment including a leaf spring strip extending outwardly from said upper surface with said cup-shaped portion located at its distal end.

11. The synchronizer mechanism of claim 10 wherein said leaf spring strip being formed from said upper surface.

12. The synchronizer mechanism of claim 10 wherein said leaf spring strip being formed from said upper surface and one of said side walls.

* * * * *